(12) United States Patent
Yan et al.

(10) Patent No.: US 11,039,019 B1
(45) Date of Patent: Jun. 15, 2021

(54) SYSTEMS AND METHODS FOR PROVIDING POLICY CONTROL OF PARALLEL SIGNALING IN A FIFTH GENERATION (5G) NETWORK

(71) Applicant: Verizon Patent and Licensing Inc., Basking Ridge, NJ (US)

(72) Inventors: Lixia Yan, Basking Ridge, NJ (US); James Mathison, Warren, NJ (US); Barry F. Hoffner, Bridgewater, NJ (US); Marc Jason Chiaverini, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/884,814

(22) Filed: May 27, 2020

(51) Int. Cl.
| | |
|---|---|
| *H04M 15/00* | (2006.01) |
| *H04W 76/12* | (2018.01) |
| *H04L 29/08* | (2006.01) |
| *H04W 4/24* | (2018.01) |

(52) U.S. Cl.
CPC .......... *H04M 15/66* (2013.01); *H04L 69/327* (2013.01); *H04W 4/24* (2013.01); *H04W 76/12* (2018.02)

(58) Field of Classification Search
CPC ....... H04M 15/66; H04W 76/12; H04W 4/24; H04L 69/327
See application file for complete search history.

(56) References Cited

U.S. PATENT DOCUMENTS

| | | | |
|---|---|---|---|
| 10,531,515 B1* | 1/2020 | Engelhart | H04M 15/8214 |
| 2019/0379544 A1* | 12/2019 | Suthar | H04W 12/06 |
| 2020/0092923 A1* | 3/2020 | Abraham | H04L 12/185 |
| 2020/0100319 A1* | 3/2020 | Talebi Fard | H04W 8/02 |
| 2020/0145538 A1* | 5/2020 | Qiao | H04M 15/59 |
| 2020/0351391 A1* | 11/2020 | Son | H04M 15/8033 |

* cited by examiner

*Primary Examiner* — Minjung Kim (57) ABSTRACT

A first network device may receive a protocol data unit (PDU) session establishment or modification request, and may perform one or more actions based on the PDU session establishment or modification request. The first network device may receive, based on performing the one or more actions, a first message indicating that the PDU session is authenticated and authorized, and may select a second network device associated with establishing or modifying a management policy for the PDU session. The first network device may receive, from the second network device, a second message indicating whether to wait for receipt of a charging data response, to a charging data request, before interacting with a third network device, and may provide the charging data request to a fourth network device while interacting with the third network device when the second message indicates not to wait for receipt of the charging data response.

20 Claims, 9 Drawing Sheets

170
Fifth example message

```
SMPolicyDecision
 SessRules
  SessRule
   sessionRuleID
   authSessionAmbr
   authDefQos
 PCCRules
  DefaultSession
  5Gbps
  5QI=8/ARP=12
 ***
 QosData
  qosId=1
  5qi =1
  mbr=10gbps
  arp=12
 ChgData
  chgId=1
  online =enabled
  offline =enabled
  sdfHandl = non_blocking
  waitChfResponse= N  ← 175
  RatingGroup =3600
 ChgData
  chgId=2
  online =enabled
  offline =enabled
  sdfHandl = blocking
  waitChfResponse= N  ← 180
  RatingGroup =3300
```

SMF won't wait for step 3a-b response and will send steps 3b and 3c messages after step 2b

185
Sixth example message

```
SMPolicyDecision
 SessRules
  SessRule
   sessionRuleID
   authSessionAmbr
   authDefQos
 PCCRules
  DefaultSession
  5Gbps
  5QI=8/ARP=12
 ***
 QosData
  qosId=1
  5qi =1
  mbr=10gbps
  arp=12
 ChgData
  chgId=1
  online =enabled
  offline =enabled
  sdfHandl = non_blocking
  waitChfResponse= N  ← 190
  RatingGroup =3600
 ChgData
  chgId=2
  online =enabled
  offline =enabled
  sdfHandl = blocking
  waitChfResponse= Y  ← 195
  RatingGroup =3300
```

SMF will wait for step 3a-b response before sending steps 3b and 3c messages

SYSTEMS AND METHODS FOR PROVIDING POLICY CONTROL OF PARALLEL SIGNALING IN A FIFTH GENERATION (5G) NETWORK

BACKGROUND

Offline charging allows telecommunications subscribers to consume a service without an upfront balance check or balance reservation. After service consumption, a telecommunications service provider may generate service usage records (e.g., charging data records) for charging the subscribers. Online charging enables a telecommunications service provider to charge subscribers, in real time, based on service usage. In a fifth generation (5G) network, with a converged charging service, a network device (e.g., a session management function (SMF)) may set up a notification channel session for every service session (e.g., protocol data unit (PDU) session). Within each PDU session, some service data flows may be associated with online charging and some service data flows may be associated with offline charging.

DETAILED DESCRIPTION OF PREFERRED EMBODIMENTS

The following detailed description of example implementations refers to the accompanying drawings. The same reference numbers in different drawings may identify the same or similar elements.

A 5G network combines online and offline charging on a single interface, which may simplify usage monitoring, usage reporting, charging and billing architecture, and/or the like. However, during a call flow setup, the converged charging service forces the SMF to wait for a response from a charging function (CHF) of the 5G network before continuing with a PDU session setup. This creates latency during PDU session setup and causes an unpleasant customer experience, such as a longer time to set up a voice call or a video call. This also wastes computing resources (e.g., processing resources, memory resources, communication resources, and/or the like), networking resources, and/or the like associated with underutilizing network resources of the 5G network, addressing customer complaints, setting up additional voice calls and/or video calls when customers discontinue voice calls and/or video calls due to the latency, and/or the like.

Some implementations described herein provide a device (e.g., a network device, such as an SMF) that provides policy control of parallel signaling in a 5G network. For example, the SMF may receive a protocol data unit (PDU) session establishment or modification request, and may perform one or more actions based on the PDU session establishment or modification request. The SMF may receive, based on performing the one or more actions, a first message indicating that the PDU session is authenticated and authorized, and may select a policy control function (PCF) associated with establishing or modifying a management policy for the PDU session. The SMF may receive, from the PCF, a second message indicating whether to wait for receipt of a charging data response, to a charging data request, before interacting with an access and mobility management function (AMF), and may provide the charging data request to a charging function (CHF) while interacting with the AMF when the second message indicates not to wait for receipt of the charging data response.

In this way, the SMF provides policy control of parallel signaling in a 5G network. This enables PDU session setup or quality of service (QoS) flow setup of a user equipment without waiting for the CHF response for the converged charging service. A policy control function (PCF) provides a mechanism that supports simultaneous signaling during PDU session setup or QoS flow initiation and/or modification. The SMF is controlled by the PCF and will not have to wait for the CHF response before continuing PDU session setup. Enabling the PCF to control the SMF provides an improved experience since the PCF contains more detailed information about subscriber profiles and can make a more informed choice about whether to wait for the CHF response before continuing PDU session setup. For example, if a subscriber is not a prepaid subscriber, a probability of receiving a negative CHF response may be low and waiting for the CHF response may not be advisable. However, if the subscriber is a prepaid subscriber, the probability of receiving a negative CHF response may be high and waiting for the CHF response may be advisable. Thus, the SMF conserves computing resources, networking resources, and/or the like that would otherwise have been wasted underutilizing network resources of the 5G network, addressing customer complaints, setting up additional voice calls and/or video calls when customers discontinue voice calls and/or video calls due to the latency, and/or the like. The SMF also reduces latency during PDU session setup and improves customer experience associated with services (e.g., a voice call or a video call setup).

Figure 1A:
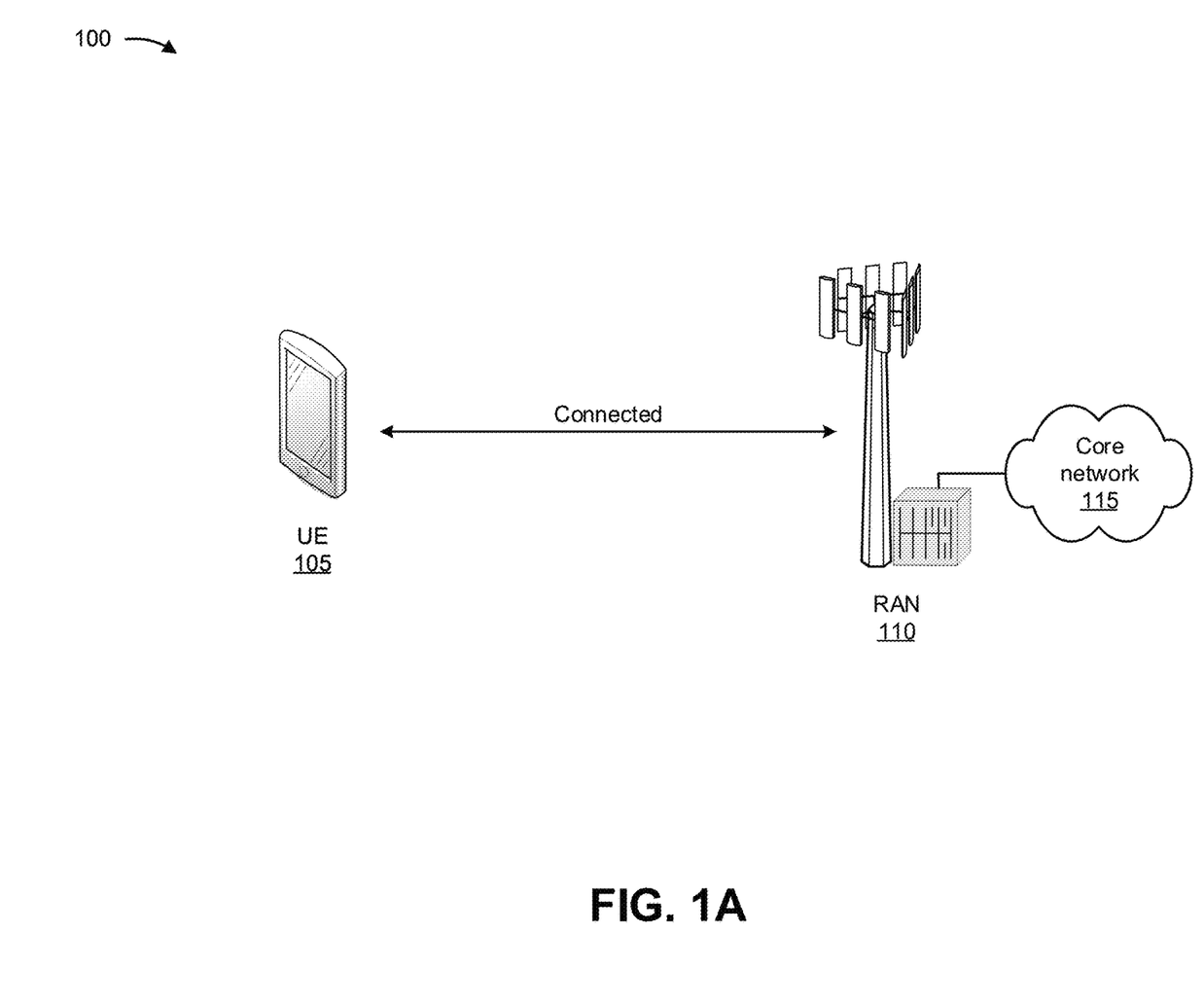
FIGS. 1A-1F are diagrams of one or more example implementations described herein.

FIGS. 1A-1F are diagrams of one or more example implementations 100 described herein. As shown in FIG. 1A, a user equipment 105 may be connected to a radio access network (RAN) 110 associated with a core network 115. User equipment 105 may include a mobile telephone, a mobile computing device, and/or the like associated with a customer of a provider of RAN 110 and/or core network 115. RAN 110 may include one or more radio transmitters. Core network 115 may include an example architecture of a 5G NG core network included in a 5G wireless telecommunications system, and may include physical elements, virtual elements, or a combination of physical and virtual elements. Although implementations are described herein in connection with a 5G core network, the implementations may be utilized with other types of core networks, such as a fourth generation (4G) core network.

Figure 1B:
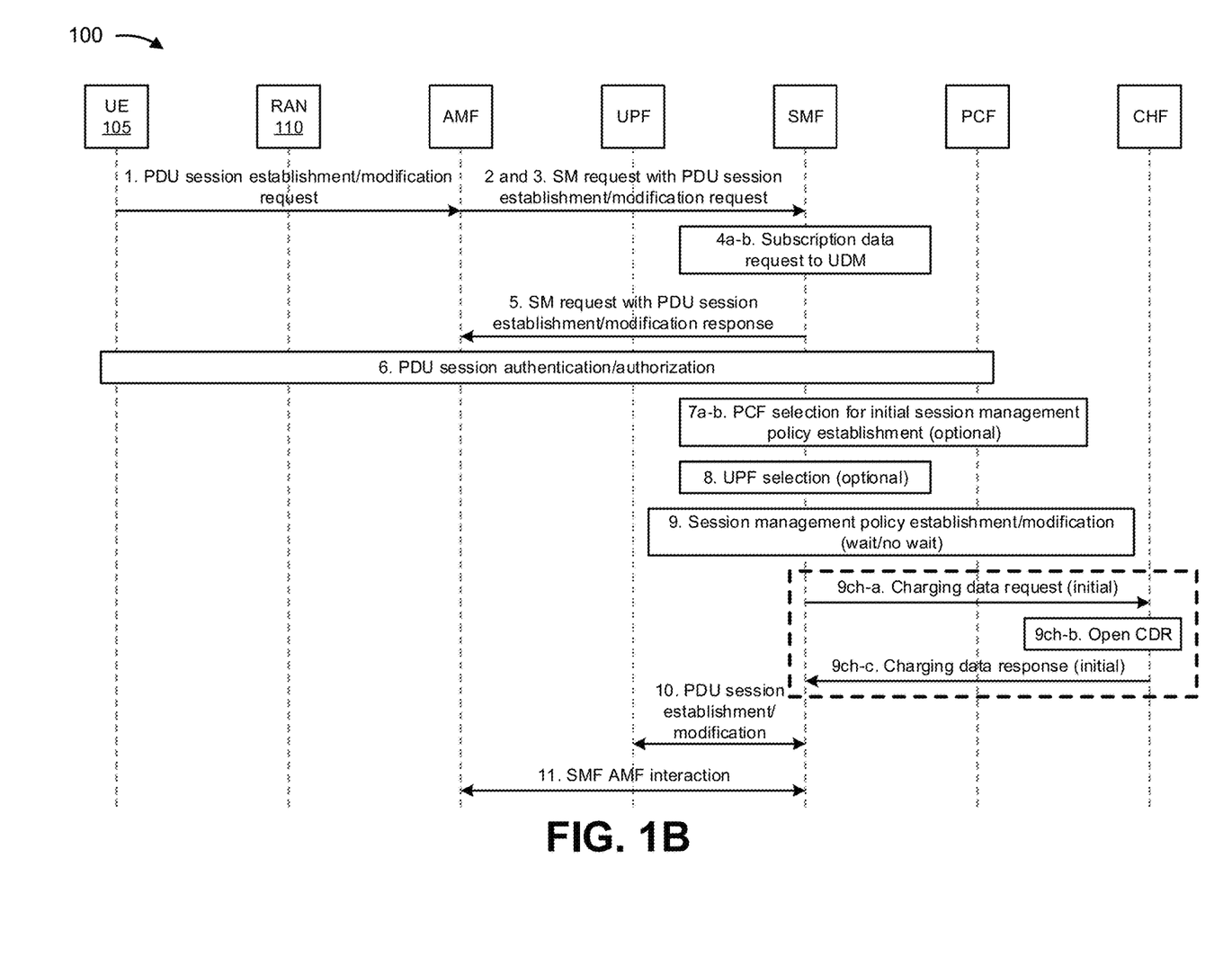

FIG. 1B is diagram of a protocol signaling procedure for establishing or modifying a PDU session for user equipment 105 based on a converged charging service. As shown in FIG. 1B, user equipment 105 and RAN 110 may be associated with an access and mobility management function (AMF), a user plane function (UPF), a session management function (SMF), a policy control function (PCF), and a charging function (CHF) of core network 115. The AMF, UPF, SMF, PCF, and CHF will be described in more detail in relation to FIG. 2.

As further shown in FIG. 1B, and by step 1, the AMF may receive, from user equipment 105, a PDU session establishment or modification request. As shown by steps 2 and 3, the SMF may receive, from the AMF, a session management (SM) request that includes the PDU session establishment or modification request. As shown by steps 4*a* and 4*b*, the SMF may request and receive subscription data from a unified data management (UDM) component (not shown) of core network 115. As further shown in FIG. 1B, and by step 5, the SMF may provide, to the AMF, an SM request that includes a PDU session establishment or modification response to the PDU session establishment or modification request. In some implementations, the SMF generates the SM request that includes the PDU session establishment or modification response based on the subscription data received from the UDM component.

The PCF may authenticate and/or authorize the PDU session establishment or modification based on the PDU session establishment or modification response generated by the SMF. As further shown in FIG. 1B, and by step 6, an optional secondary authentication may be performed for enterprise users by user equipment 105, the SMF, and an external data network authentication, authorization, and accounting (DN-AAA) server. As shown by optional steps 7*a* and 7*b*, the SMF may select a PCF (e.g., the PCF shown in FIG. 1B), and may interact with the PCF (e.g., over an N7 interface) to establish a new session management policy for the PDU session. As shown by optional step 8, the SMF may select a UPF (e.g., the UPF shown in FIG. 1B) from core network 115. For a new session establishment, steps 7*a* and 7*b* occur as shown in FIG. 1B. Step 7*a* is a PCF selection step, and step 7*b* is a session establishment message exchange between the PCF and the SMF. In this case, the PCF may provide wait/no-wait information in initial SM policy results returned to the SMF in step 7*b*. Also, for a new session establishment, step 8 occurs before step 7*b*. The SMF may send, to the PCF in step 7*b*, a message that includes an IP address to be assigned, and the SMF cannot assign the IP address until after the SMF has completed the UPF selection. For a session modification, step 7*a* is not required because the SMF selected the PCF when the session is initially established. However, step 7*b* may still occur, with the SMF reporting a trigger change to the PCF, and the PCF may send new policies to the SMF.

As further shown in FIG. 1B, and by step 9, the SMF may interact with the PCF (e.g., over the N7 interface) to perform a session management policy establishment and/or modification. For example, the session management policy establishment and/or modification may include an establishment of and/or a modification to the PDU session for user equipment 105, the PCF returning wait/not wait instructions to the SMF, and/or the like. In step 9*ch-a*, the SMF may provide a charging data request (e.g., an initial charging data request) to the CHF of core network 115. Step 9*ch-a* may include the SMF providing an initial charging request (e.g., for session establishment) to the CHF or the SMF providing an update (e.g., for session modification) to the CHF. A wait/no-wait parameter specified by the PCF could apply in both cases. In steps 9*ch-b* and 9*ch-c*, the CHF may open a charging data record, and may provide, based on the charging data request, a charging data response to the SMF. The charging data request (e.g., provided by the SMF to the CHF) may include data indicating offline charging for user equipment 105, online charging for user equipment 105, whether a charging rule is online or not based on policies provided by the PCF, and/or the like. As shown in step 10, the SMF may provide a PDU session/establishment modification request to the UPF. Additionally, as shown by step 11, the SMF may interact with the AMF to establish and/or modify the PDU session.

When interacting with the PCF to perform the session management policy modification, as described above with respect to steps 7*b* and 9, the SMF may receive a message from the PCF that indicates whether the SMF should wait for the charging data response (described above with respect to step 9*ch-c*) before interacting with the AMF (described above with respect to step 11) or the UPF (described above with respect to step 10). If the message from the PCF indicates that the SMF should not wait for the charging data response, the SMF may provide the charging data request (step 9*ch-a*) and the PDU session/establishment modification request (step 10) in parallel and, upon receiving a PDU session establishment/modification response to the session/establishment modification request from the UPF, may interact with the AMF (step 11), without waiting for the charging data response (step 9*ch-c*). After receiving the message from the CHF, the SMF may provide, to the UPF, quota information provided in the message from the PCF (e.g., to update the UPF). If, however, the message from the CHF indicates that the SMF should wait for the charging data response, the SMF may wait for the charging data response (step 9*ch-c*) and may wait for the PDU session/establishment modification request (step 10) before interacting with the AMF (step 11). For example, the SMF may wait for an actual quota allocation from the CHF that is needed to configure the UPF in step 10.

Figure 1C:
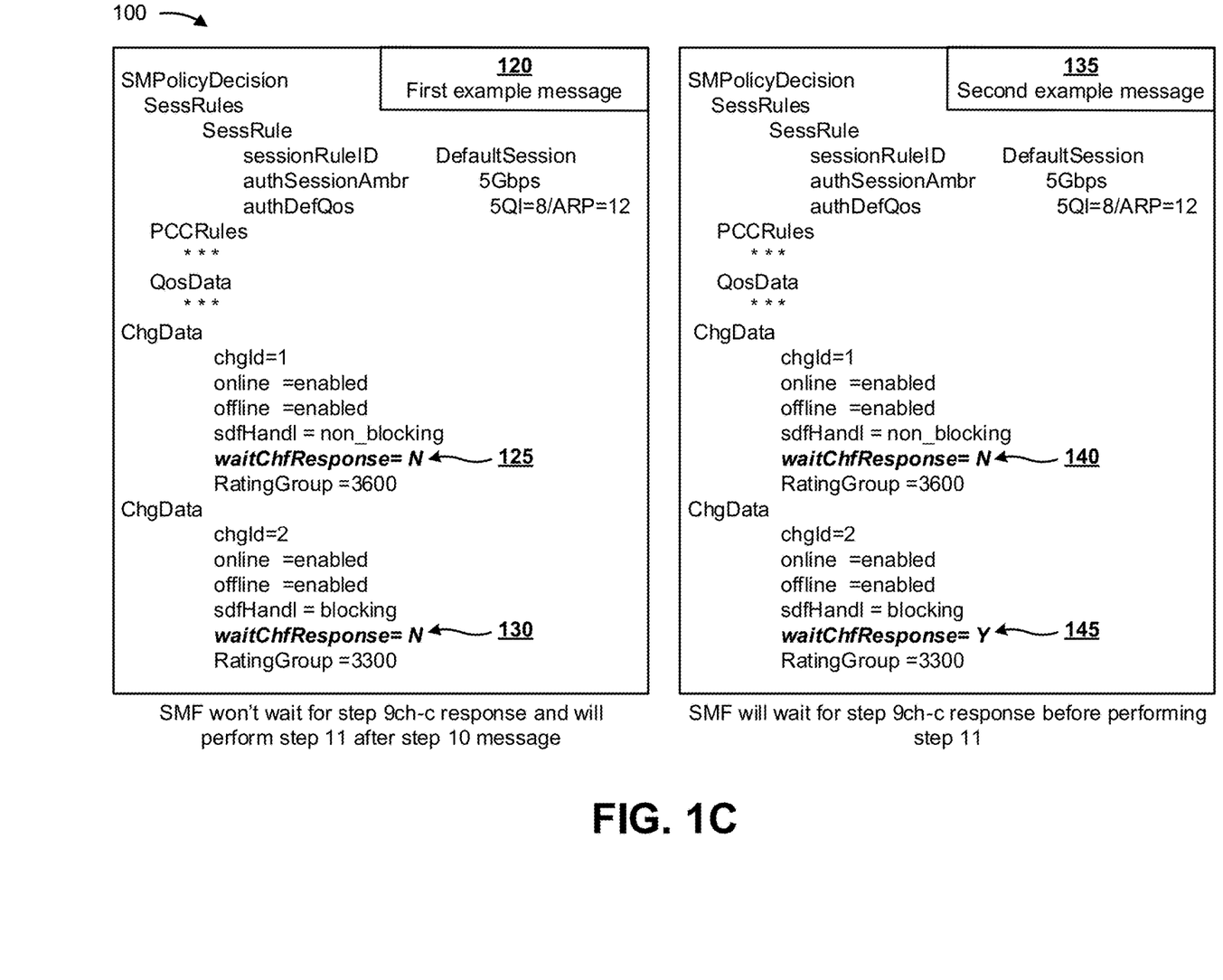

FIG. 1C shows examples of messages (e.g., that the SMF may receive from the PCF) indicating whether the SMF should wait for the charging data response when establishing or modifying a PDU session for user equipment 105 based on a converged charging service, as described above. The messages may include at least one variable (e.g., a Boolean "waitChfResponse" variable indicating whether to wait for the charging data response) provided as an attribute within a data type (e.g., a charging data type) utilized at a rule level over an interface between the SMF and the PCF. When establishing or modifying the PDU session for user equipment 105 based on a converged charging service, the SMF may apply the rules in a message to determine whether to wait for the charging data response. If the rules in the message indicate to not wait for the charging data response (e.g., waitChfResponse=N), the SMF will not wait for the charging data response from the CHF (step 9*ch-c*), and will interact with the AMF and the UPF (step 11) immediately upon receiving the message. However, if any of the rules in the message indicate to wait for the charging data response (e.g., waitChfResponse=Y), the SMF will wait for the charging data response from the CHF (step 9*ch-c*) before interacting with the AMF and the UPF (step 11).

For example, as shown by reference number 120, a first example message may include charging data for a first charging control policy (e.g., identified by chgId=1) and an indication to not wait for the charging data response (e.g., waitChfResponse=N), as shown by reference number 125. The first example message may also include charging data for a second charging control policy (e.g., identified by chgId=2) and an indication to not wait for the charging data response (e.g., waitChfResponse=N), as shown by reference number 130. In this case, since the rules in the first example message indicate to not wait for the charging data response, the SMF will not wait for the charging data response from the CHF (step 9*ch-c*), and will interact with the AMF and the UPF (step 11) immediately upon receiving the first example message.

As further shown in FIG. 1C, and by reference number 135, a second example message may include charging data for a first charging control policy (e.g., identified by chgId=1) and an indication to not wait for the charging data response (e.g., waitChfResponse=N), as shown by reference number 140. The second example message may include charging data for a second charging control policy (e.g., identified by chgId=2) and an indication to wait for the charging data response (e.g., waitChfResponse=Y), as shown by reference number 145. In this case, as one of the rules in the second example message indicates to wait for the charging data response, the SMF will wait for the charging data response from the CHF (step 9*ch-c*) before interacting with the AMF and the UPF (step 11).

Figure 1D:
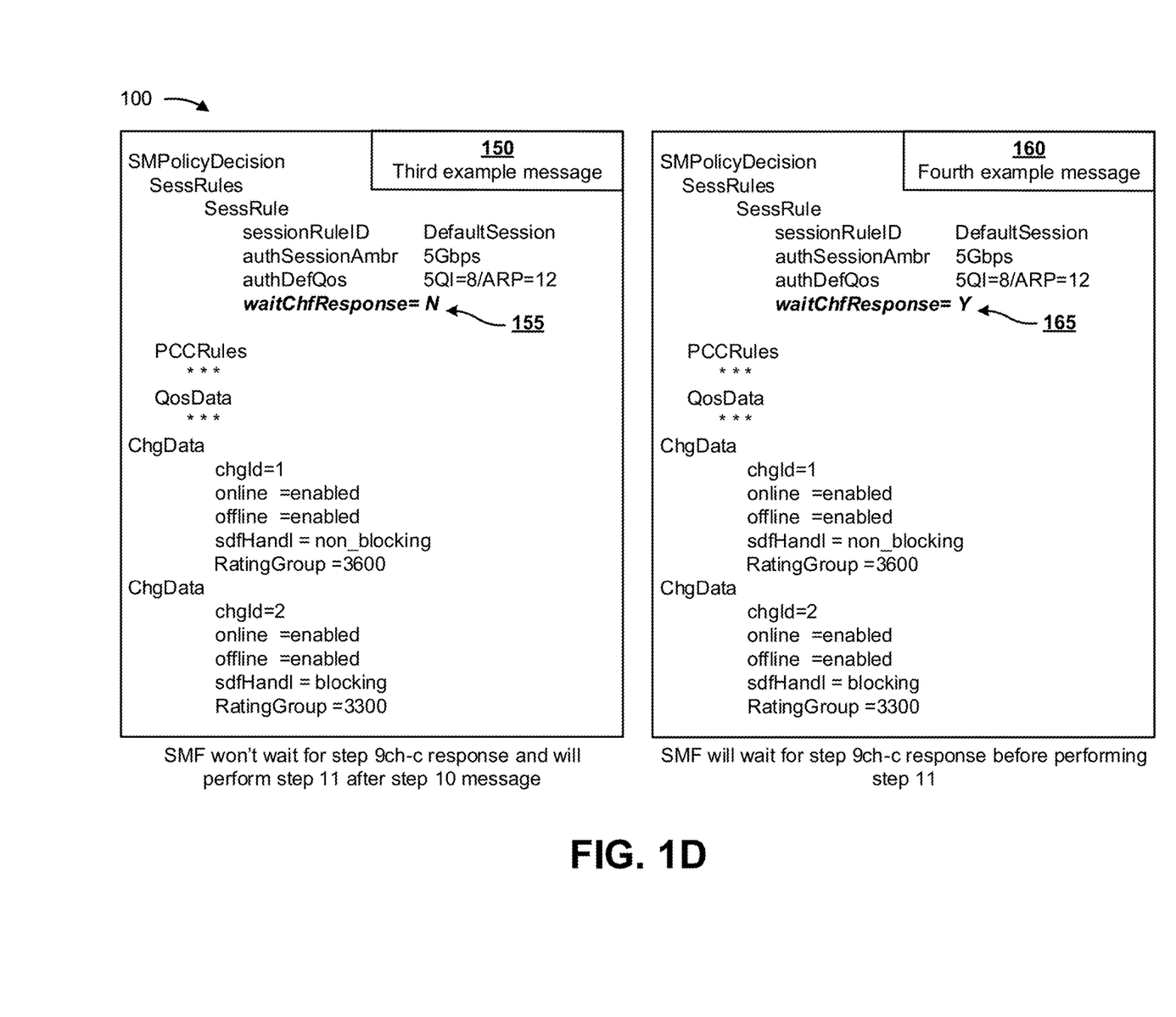

Alternatively, or additionally, the variable (e.g., a Boolean "waitChfResponse" variable) may be provided as an attribute utilized at a session level over the interface between the SMF and the PCF. FIG. 1D shows examples of messages (e.g., that the SMF may receive from the PCF) indicating whether the SMF should wait for the charging data response when establishing or modifying a PDU session for user equipment 105 based on a converged charging service, as described above. For example, as shown by reference number 150, a third example message may include a session rule that indicates to not wait for the charging data response (e.g., waitChfResponse=N), as shown by reference number 155. In this case, the SMF will not wait for the charging data response from the CHF (step 9*ch-c*), and will interact with the AMF and the UPF (step 11) immediately upon receiving the third example message. As further shown in FIG. 1D, and by reference number 160, a fourth example message may include a session rule that indicates to wait for the charging data response (e.g., waitChfResponse=Y), as shown by reference number 165. In this case, the SMF will wait for the charging data response from the CHF (step 9*ch-c*) before interacting with the AMF and the UPF (step 11).

Figure 1E:
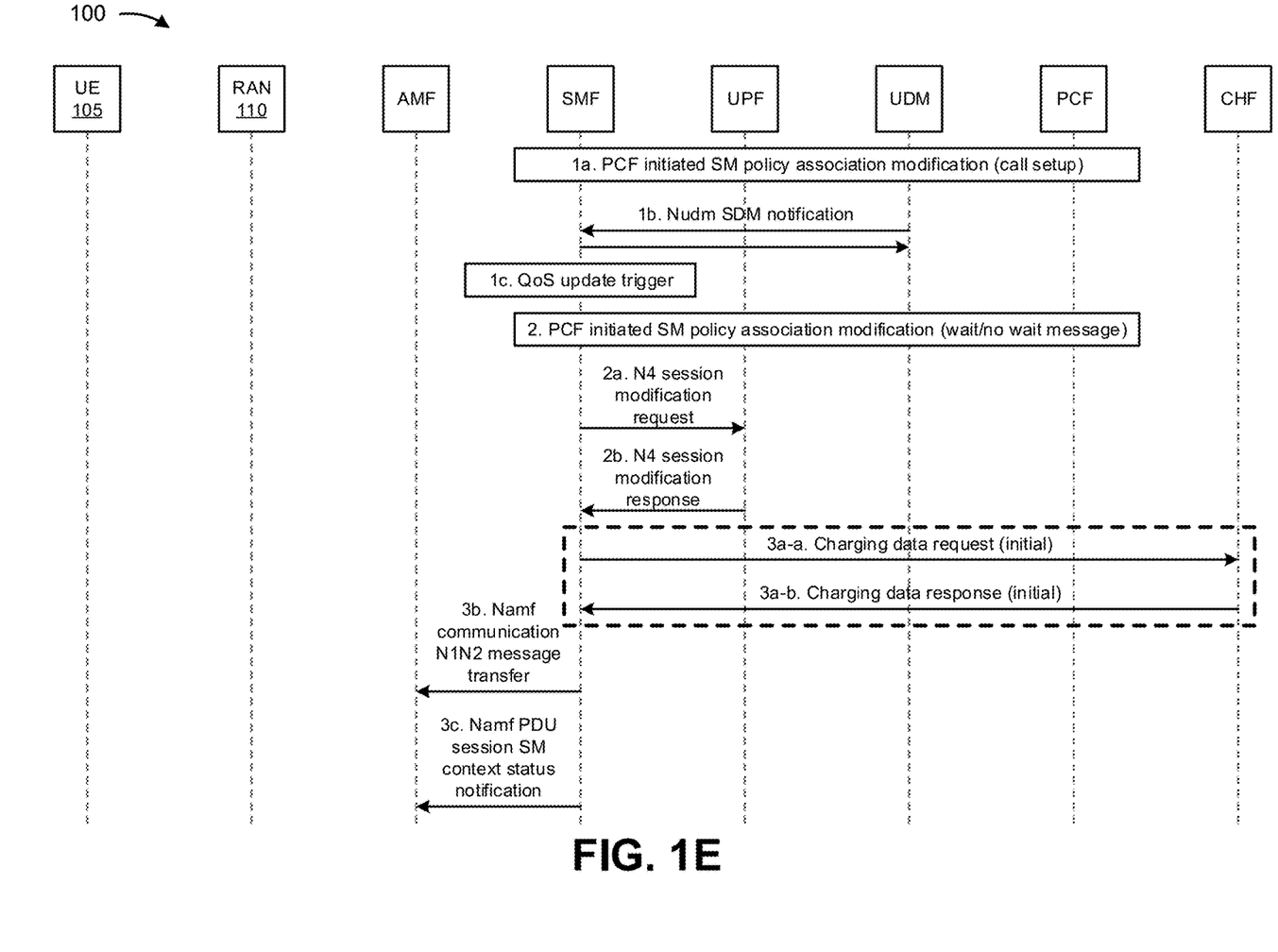

FIG. 1E is a diagram of a protocol signaling procedure for initiating or modifying a QoS flow based on a converged charging service. As shown in FIG. 1E, user equipment 105 and RAN 110 may be associated with an AMF, an SMF, a UPF, a UDM, a PCF, and a CHF of core network 115. As shown by step 1*a*, the PCF may initiate a session management (SM) policy association modification (e.g., to set up a voice call or a video call) with the SMF, and may notify the SMF about the modification of a charging policy. As shown by step 1*b*, the SMF may receive, from the UDM, a UDM service-based interface (Nudm) subscriber data management (SDM) notification to update subscription data associated with the SMF. The SMF may update the session management subscription based on the Nudm SDM notification, and may provide, to the UDM, a response indicating that the session management subscription has been updated. As shown by step 1*c*, the SMF may receive a trigger message and may forward the trigger message to the PCF, leading to a modification of the SM policy association, as shown in step 2. Regardless of the mechanism that initiates the SM policy association modification, the PCF may push new charging rules to the SMF in either step 1*a* or step 2, and in both cases the PCF may include the wait/no-wait information along with the new rules.

As further shown in FIG. 1E, the SMF may initiate a session management (SM) policy association modification to modify an SM policy with a wait or no wait indication based on a message received in steps 1*a* or 2, as will be described below. As shown in step 2*a*, the SMF may provide an N4 session modification request to the UPF. As shown by step 2*b*, the UPF may provide, to the SMF, an N4 session modification response to the N4 session modification request. As shown in step 3*a-a*, the SMF may provide a charging data request (e.g., an initial charging data request) to the CHF. As shown in step 3*a-b*, the CHF may provide a charging data response (e.g., an initial charging data response) to the SMF. As shown in step 3*b*, the SMF may provide an AMF service-based interface (Namf) communication N1N2 message transfer to the AMF. Additionally, or alternatively, as shown in step 3*c*, the SMF may provide a Namf PDU session SM context status notification to the AMF.

When initiating the SM policy association modification with the SMF, the PCF may return a message that indicates whether the SMF should wait for the charging data response from the CHF (step 3*a-b*) before providing the N4 session modification request (step 2) to the UPF, Namf communication N1N2 message transfer (step 3*b*) and/or the Namf PDU session SM context status notification (step 3*c*) to the AMF. If the message from the PCF indicates that the SMF should not wait for the charging data response, the SMF may provide, to the UPF, the N4 session modification request and, to the AMF, the Namf communication N1N2 message transfer (step 3*b*) and/or the Namf PDU session SM context status notification (step 3*c*) in parallel with providing the charging data request (step 3*a-a*) to the CHF. If, however, the message from the PCF indicates that the SMF should wait for the charging data response, the SMF may wait for the charging data response from the CHF (step 3*a-b*) before providing the N4 session modification request (step 2), Namf communication N1N2 message transfer (step 3*b*) and/or the Namf PDU session SM context status notification (step 3*c*) to the AMF.

Figure 1F:
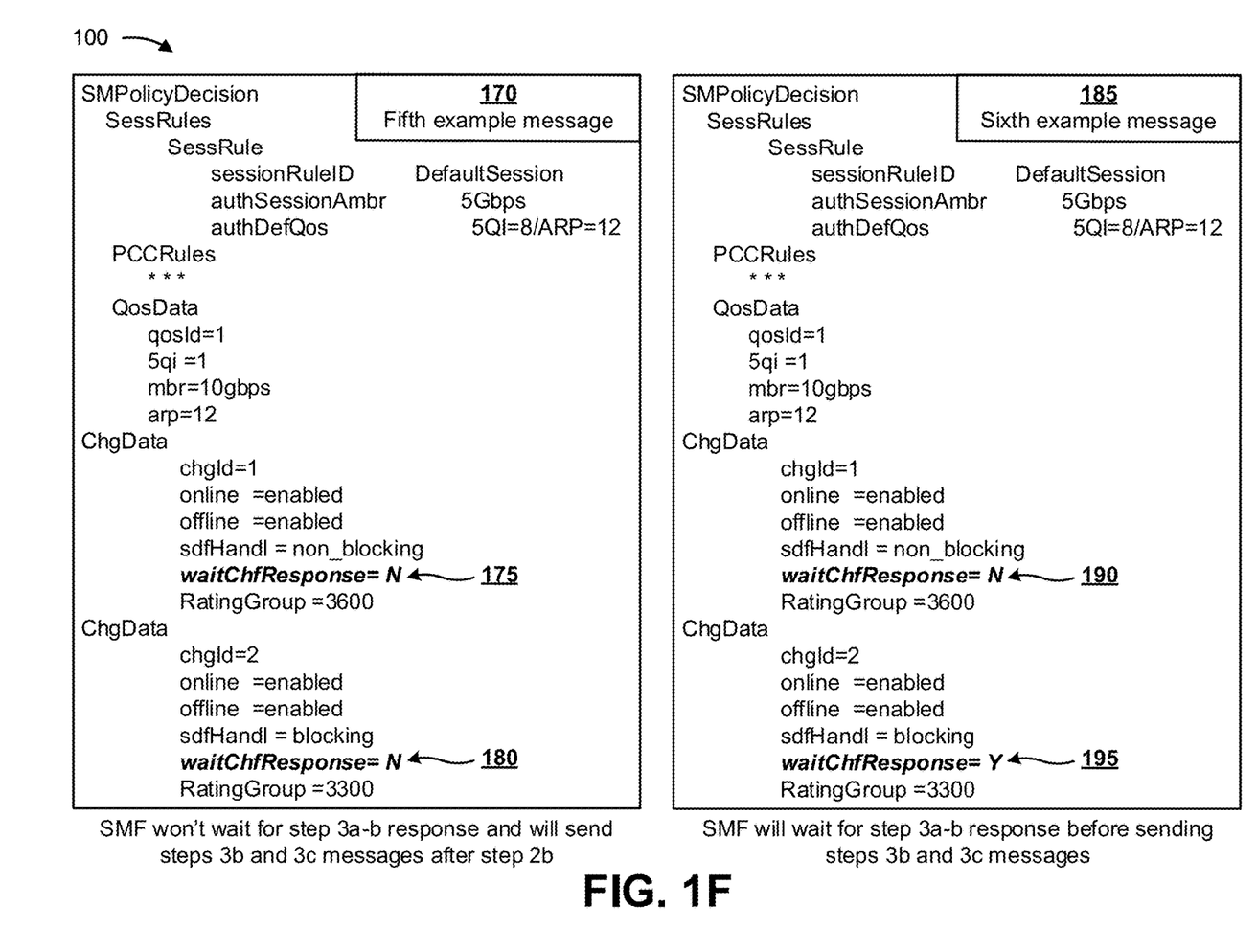

FIG. 1F shows examples of messages (e.g., that the SMF may receive from the PCF) indicating whether the SMF should wait for the charging data response when initiating or modifying a QoS flow based on a converged charging service, as described above. The messages may include at least one variable (e.g., a Boolean variable "waitChfResponse") provided as an attribute within a data type (e.g., a charging data type) utilized at a rule level over an interface between the SMF and the PCF. When initiating or modifying the QoS flow based on a converged charging service, the SMF may apply the rules in the messages to determine whether to wait for the charging data response. If the rules in the message indicate to not wait for the charging data response (e.g., waitChfResponse=N), the SMF will not wait for the charging data response from the CHF (step 3*a-b*), and will provide the Namf communication N1N2 message transfer (step 3*b*) and/or the Namf PDU session SM context status notification (step 3*c*) immediately upon receiving the message (e.g., and the UPF communication may also wait or not wait). If any of the rules in the message indicate to wait for the charging data response (e.g., waitChfResponse=Y), the SMF will wait for the charging data response from the CHF (step 3*a-b*) before providing the Namf communication N1N2 message transfer (step 3*b*) and/or the Namf PDU session SM context status notification (step 3*c*) to the AMF.

For example, as shown by reference number 170, a fifth example message may include charging data for a first charging control policy (e.g., identified by chgId=1) and an indication to not wait for the charging data response (e.g., waitChfResponse=N), as shown by reference number 175. The fifth example message may include charging data for a second charging control policy (e.g., identified by chgId=2) and an indication to not wait for the charging data response (e.g., waitChfResponse=N), as shown by reference number

180. In this case, as the rules in the fifth example message include the indication to not wait for the charging data response (e.g., waitChfResponse=N), the SMF will not wait for the charging data response from the CHF (step 3*a-b*), and will provide the Namf communication N1N2 message transfer (step 3*b*) and/or the Namf PDU session SM context status notification (step 3*c*) immediately upon receiving the fifth example message (e.g., and the UPF communication may also wait or not wait).

As another example, and as shown by reference number 185, a sixth example message may include charging data for a first charging control policy (e.g., identified by chgId=1) and an indication to not wait for the charging data response (e.g., waitChfResponse=N), as shown by reference number 190. The sixth example message may include charging data for a second charging control policy (e.g., identified by chgId=2) and an indication to wait for the charging data response (e.g., waitChfResponse=Y), as shown by reference number 195. In this case, as one of the rules in the sixth example message includes the indication to wait for the charging data response (e.g., waitChfResponse=Y), the SMF will wait for the charging data response from the CHF (step 3*a-b*) before providing the Namf communication N1N2 message transfer (step 3*b*) and/or the Namf PDU session SM context status notification (step 3*c*) to the AMF (e.g., and the UPF communication may also wait or not wait).

In this way, the SMF and/or the PCF of core network 115 provides policy control of parallel signaling in core network 115. This enables PDU session setup or QoS flow setup of user equipment 105 without waiting for a response from a CHF of core network 115 for a converged charging service. Thus, the SMF and/or the PCF conserves computing resources, networking resources, and/or the like that would otherwise have been wasted underutilizing network resources of the 5G network, addressing customer complaints, setting up additional voice calls and/or video calls when customers discontinue voice calls and/or video calls due to the latency, and/or the like.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
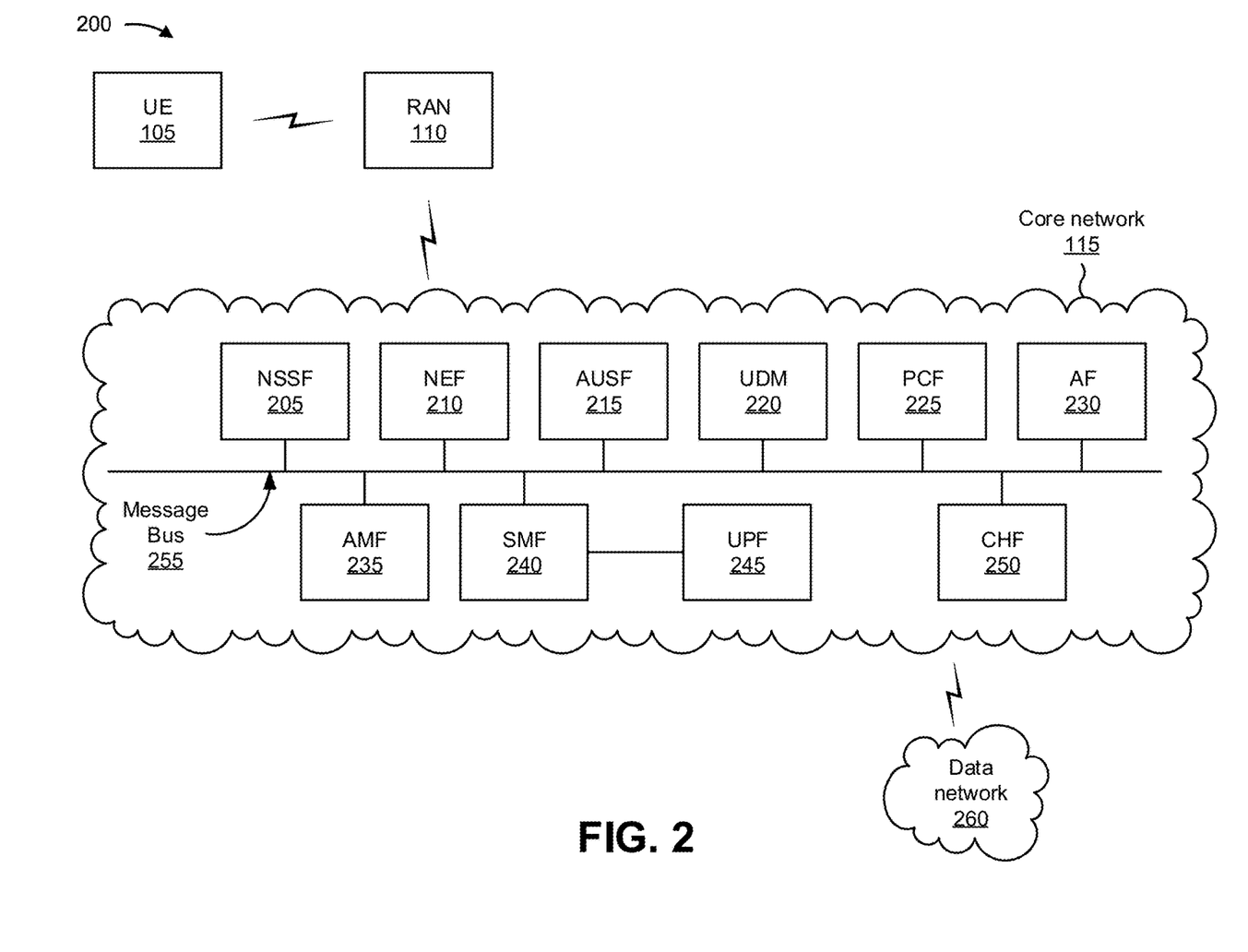
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user equipment 105, RAN 110, core network 115, and a data network 260. Devices and/or networks of example environment 200 may interconnect via wired connections, wireless connections, or a combination of wired and wireless connections.

User equipment 105 includes one or more devices capable of receiving, generating, storing, processing, and/or providing information, such as information described herein. For example, user equipment 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user equipment 105. RAN 110 may transfer traffic between user equipment 105 (e.g., using a cellular RAT), one or more base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for user equipment 105 covered by RAN 110 (e.g., user equipment 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of user equipment 105 covered by RAN 110).

In some implementations, core network 115 may include an example functional architecture in which systems and/or methods described herein may be implemented. For example, core network 115 may include an example architecture of a 5G next generation (NG) core network included in a 5G wireless telecommunications system. While the example architecture of core network 115 shown in FIG. 2 may be an example of a service-based architecture, in some implementations, core network 115 may be implemented as a reference-point architecture.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, a charging function (CHF) 250, and/or the like. These functional elements may be communicatively connected via a message bus 255. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for user equipment 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating user equipment 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like. PCF 225 includes one or more devices that aggregate information to and from core network 115, operational support systems, other sources, and/or the like in real time; support creation of rules; automatically make policy decisions for each subscriber active on core network 115, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like. AMF 235 includes one or more devices that manage authentication, activation, deactivation, and/or mobility functions associated with user equipment 105; facilitate selection of a particular SMF 240 and/or a particular UPF 245 to serve traffic to and/or from user equipment 105, and/or the like.

SMF 240 includes one or more devices that support the establishment, modification, and release of communication sessions in the wireless telecommunications system. For example, SMF 240 may configure traffic steering policies at UPF 245, enforce user equipment IP address allocation and policies, and/or the like. SMF 240 includes one or more devices that aggregate traffic received from RAN 110 and send the aggregated traffic to data network 260 (e.g., via UPF 245).

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like. UPF 245 includes one or more devices that provide connectivity for user equipment 105 to external packet data networks, such as data network 260.

CHF 250 includes one or more devices that enable charging for services to be offered to authorized network functions. In some implementations, CHF 250 supports a converged online and offline charging (e.g., a converged charging service). CHF 250 may track resource usage associated with user equipment 105 in core network 115 as reported by UPF 245 for billing purposes.

Message bus 255 represents a communication structure for communication among the functional elements. In other words, message bus 255 may permit communication between two or more functional elements.

Data network 260 includes one or more wired and/or wireless data networks. For example, data network 260 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
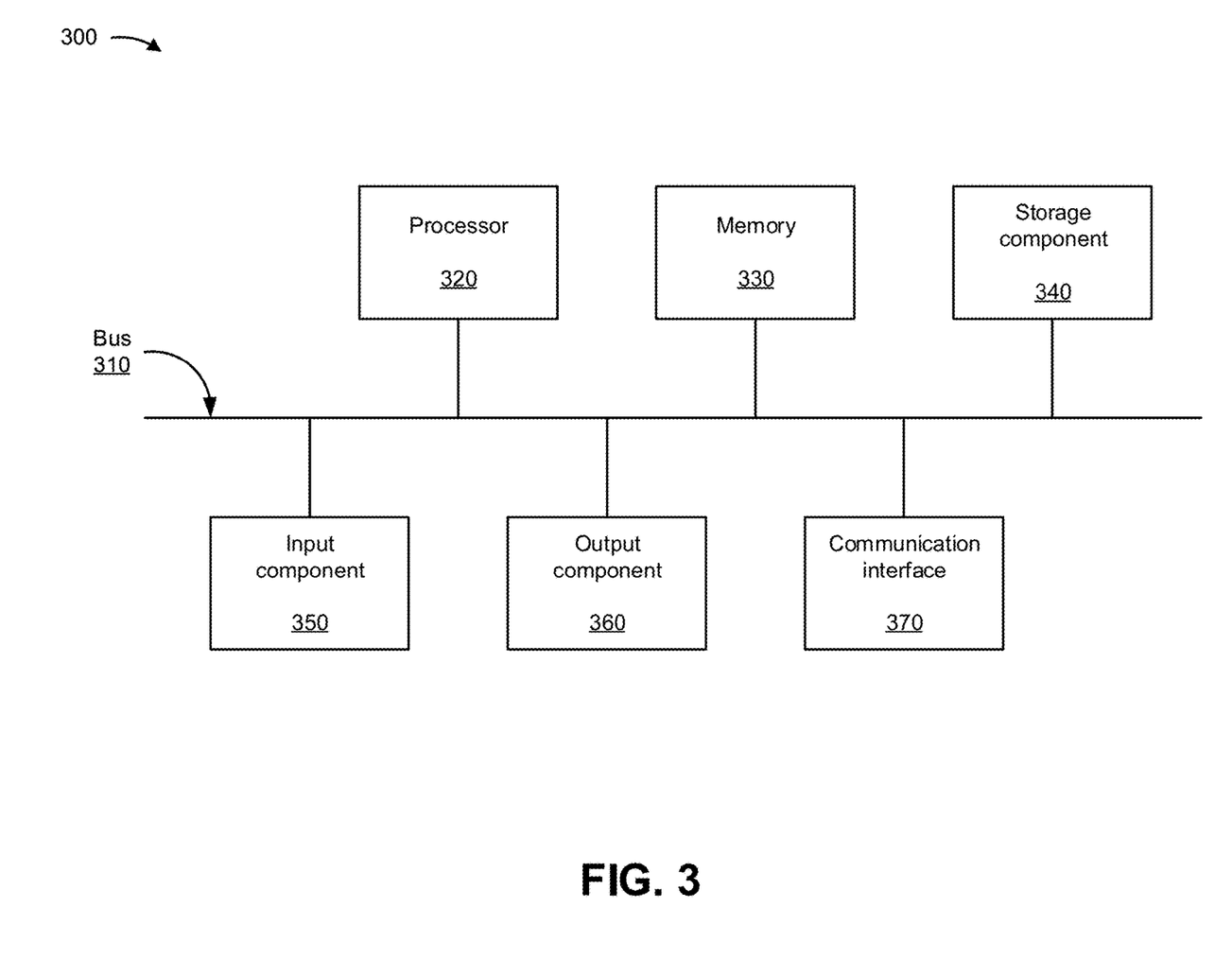
FIG. 3 is a diagram of example components of one or more devices of FIG. 2.

FIG. 3 is a diagram of example components of a device 300. Device 300 may correspond to user equipment 105, NSSF 205, NEF 210, AUSF 215, UDM 220, PCF 225, AF 230, AMF 235, SMF 240, UPF 245, and/or CHF 250. In some implementations, user equipment 105, NSSF 205, NEF 210, AUSF 215, UDM 220, PCF 225, AF 230, AMF 235, SMF 240, UPF 245, and/or CHF 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
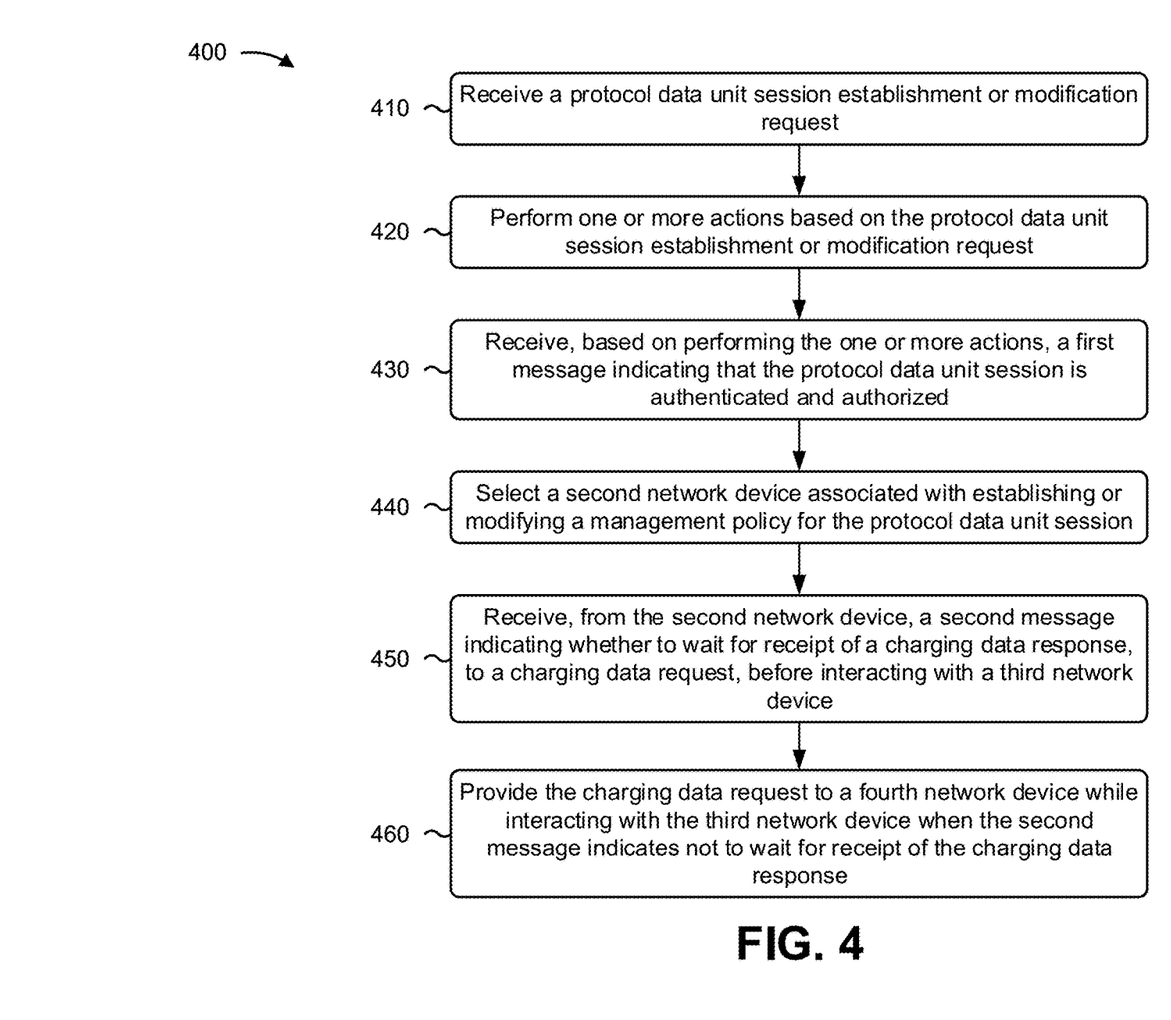
FIG. 4 is a flow chart of an example process for providing policy control of parallel signaling in a 5G network.

FIG. 4 is a flow chart of an example process 400 for providing policy control of parallel signaling in a 5G network. In some implementations, one or more process blocks of FIG. 4 may be performed by a first network device (e.g., SMF 240). In some implementations, one or more process blocks of FIG. 4 may be performed by another device or a group of devices separate from or including the first network device, such as UDM 220, PCF 225, AMF 235, UPF 245, CHF 250, and/or the like.

As shown in FIG. 4, process 400 may include receiving a protocol data unit session establishment or modification request (block 410). For example, the first network device (e.g., using processor 320, communication interface 370, and/or the like) may receive a protocol data unit session establishment or modification request, as described above.

As further shown in FIG. 4, process 400 may include performing one or more actions based on the protocol data unit session establishment or modification request (block 420). For example, the first network device (e.g., using processor 320, memory 330, communication interface 370, and/or the like) may perform one or more actions based on the protocol data unit session establishment or modification request, as described above. In some implementations, performing the one or more actions includes providing a subscription data request to a fifth network device of the network; generating a protocol data unit session establishment or modification response to the protocol data unit session establishment or modification request, wherein the protocol data unit session is authenticated and authorized based on the subscription data request and the protocol data unit session establishment or modification response. In some implementations, performing the one or more actions includes providing a subscription data request to a fifth network device of the network; generating a protocol data unit session establishment or modification response to the protocol data unit session establishment or modification request, wherein the protocol data unit session is authenticated and authorized based on the subscription data request and the protocol data unit session establishment or modification response.

As further shown in FIG. 4, process 400 may include receiving, based on performing the one or more actions, a first message indicating that the protocol data unit session is authenticated and authorized (block 430). For example, the first network device (e.g., using processor 320, communication interface 370, and/or the like) may receive, based on performing the one or more actions, a first message indicating that the protocol data unit session is authenticated and authorized, as described above.

As further shown in FIG. 4, process 400 may include selecting a second network device associated with establishing or modifying a management policy for the protocol data unit session (block 440). For example, the first network device (e.g., using processor 320, storage component 340, and/or the like) may select a second network device (e.g., the PCF) associated with establishing or modifying a management policy for the protocol data unit session, as described above.

As further shown in FIG. 4, process 400 may include receiving, from the second network device, a second message indicating whether to wait for receipt of a charging data response, to a charging data request, before interacting with a third network device (block 450). For example, the first network device (e.g., using processor 320, communication interface 370, and/or the like) may receive, from the second network device, a second message indicating whether to wait for receipt of a charging data response, to a charging data request, before interacting with a third network device (e.g., the AMF), as described above. In some implementations, the second message includes a charging data field that indicates whether to wait for receipt of the charging data response, to the charging data request, before interacting with the third network device. In some implementations, the second message includes a session rule field that indicates whether to wait for receipt of the charging data response, to the charging data request, before interacting with the third network device.

As further shown in FIG. 4, process 400 may include providing the charging data request to a fourth network device while interacting with the third network device when the second message indicates not to wait for receipt of the charging data response (block 460). For example, the first network device (e.g., using processor 320, memory 330, communication interface 370, and/or the like) may provide the charging data request to a fourth network device (e.g., the CHF) while interacting with the third network device when the second message indicates not to wait for receipt of the charging data response, as described above. In some implementations, the first network device includes a session management function, the second network device includes a policy control function, the third network device includes an access and mobility management function, and the fourth network device includes a charging function.

Process 400 may include additional implementations, such as any single implementation or any combination of implementations described below and/or in connection with one or more other processes described elsewhere herein.

In some implementations, process 400 includes waiting for receipt of the charging data response before interacting with the third network device when the second message indicates to wait for receipt of the charging data response.

In some implementations, process 400 includes waiting for establishment or modification of the protocol data unit session before interacting with the third network device.

In some implementations, process 400 includes receiving, from the third network device, a policy association modification; triggering a quality of service is updating based on the policy association modification; receiving, from the third network device, a third message indicating whether to wait for receipt of another charging data response, to another charging data request, before interacting with the fourth network device; and providing the other charging data request to the fifth network device while interacting with the fourth network device when the third message indicates not to wait for receipt of the other charging data response.

In some implementations, the policy association modification is associated with a video call or a voice call for a user equipment.

In some implementations, process 400 includes waiting for receipt of the other charging data response before interacting with the fourth network device when the third message indicates to wait for receipt of the other charging data response.

In some implementations, process 400 includes providing a context status notification, associated with the protocol data unit session, and a message transfer to the fourth network device.

In some implementations, the third message includes a charging data field that indicates whether to wait for receipt of the other charging data response, to the other charging data request, before interacting with the fourth network device.

In some implementations, the first network device provides a converged charging service that combines online charging and offline charging on a single interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a first network device of a network, a protocol data unit session establishment or modification request;
    performing, by the first network device, one or more actions based on the protocol data unit session establishment or modification request;
    receiving, by the first network device and based on performing the one or more actions, a first message indicating that the protocol data unit session is authenticated and authorized;
    selecting, by the first network device, a second network device associated with establishing or modifying a management policy for the protocol data unit session;
    receiving, by the first network device and from the second network device, a second message indicating whether to wait for receipt of a charging data response, to a charging data request, before interacting with a third network device; and
    providing, by the first network device, the charging data request to a fourth network device while interacting with the third network device when the second message indicates not to wait for receipt of the charging data response.

2. The method of claim 1, further comprising:
waiting for receipt of the charging data response before interacting with the third network device when the second message indicates to wait for receipt of the charging data response.

3. The method of claim 1, further comprising:
waiting for establishment or modification of the protocol data unit session before interacting with the third network device.

4. The method of claim 1, wherein performing the one or more actions comprises:
providing a subscription data request to a fifth network device of the network; and
generating a protocol data unit session establishment or modification response to the protocol data unit session establishment or modification request,
wherein the protocol data unit session is authenticated and authorized based on the subscription data request and the protocol data unit session establishment or modification response.

5. The method of claim 1, wherein the second message includes a charging data field that indicates whether to wait for receipt of the charging data response, to the charging data request, before interacting with the third network device.

6. The method of claim 1, wherein the second message includes a session rule field that indicates whether to wait for receipt of the charging data response, to the charging data request, before interacting with the third network device.

7. The method of claim 1, wherein:
the first network device includes a session management function,
the second network device includes a policy control function,
the third network device includes an access and mobility management function, and
the fourth network device includes a charging function.

8. A first network device, comprising:
one or more memories; and
one or more processors, communicatively coupled to the one or more memories, configured to:
receive a protocol data unit session establishment or modification request;
provide a subscription data request to a second network device based on the protocol data unit session establishment or modification request;
generate a protocol data unit session establishment or modification response to the protocol data unit session establishment or modification request;
receive, based on the subscription data request and the protocol data unit session establishment or modification response, a first message indicating that the protocol data unit session is authenticated and authorized;
select a third network device associated with establishing or modifying a management policy for the protocol data unit session;
receive, from the third network device, a second message indicating whether to wait for receipt of a charging data response, to a charging data request, before interacting with a fourth network device; and
provide the charging data request to a fifth network device while interacting with the fourth network device when the second message indicates not to wait for receipt of the charging data response.

9. The first network device of claim 8, wherein the one or more processors are further configured to:
receive, from the third network device, a policy association modification;
trigger a quality of service update based on the policy association modification;
receive, from the third network device, a third message indicating whether to wait for receipt of another charging data response, to another charging data request, before interacting with the fourth network device; and
provide the other charging data request to the fifth network device while interacting with the fourth network device when the third message indicates not to wait for receipt of the other charging data response.

10. The first network device of claim 9, wherein the policy association modification is associated with a video call or a voice call for a user equipment.

11. The first network device of claim 9, wherein the one or more processors are further configured to:
wait for receipt of the other charging data response before interacting with the fourth network device when the third message indicates to wait for receipt of the other charging data response.

12. The first network device of claim 9, wherein the one or more processors, when interacting with the fourth network device, are configured to:
provide a context status notification, associated with the protocol data unit session, and a message transfer to the fourth network device.

13. The first network device of claim 9, wherein the third message includes a charging data field that indicates whether to wait for receipt of the other charging data response, to the other charging data request, before interacting with the fourth network device.

14. The first network device of claim 8, wherein the first network device provides a converged charging service that combines online charging and offline charging on a single interface.

15. A non-transitory computer-readable medium storing instructions, the instructions comprising:
one or more instructions that, when executed by one or more processors of a first network device, cause the one or more processors to:
receive a session establishment or modification request;
perform one or more actions based on the session establishment or modification request;
receive, based on performing the one or more actions, a first message indicating that the session is authenticated and authorized;
select a second network device associated with establishing or modifying a management policy for the session;
receive, from the second network device, a second message indicating whether to wait for receipt of a charging data response, to a charging data request, before interacting with a third network device; and
provide the charging data request to a fourth network device while interacting with the third network device when the second message indicates not to wait for receipt of the charging data response.

16. The non-transitory computer-readable medium of claim 15, wherein the one or more instructions, when executed by the one or more processors, further cause the one or more processors to:
wait for receipt of the charging data response before interacting with the third network device when the second message indicates to wait for receipt of the charging data response.

17. The non-transitory computer-readable medium of claim 15, wherein the one or more instructions, when executed by the one or more processors, further cause the one or more processors to:
  wait for establishment or modification of the session before interacting with the third network device.

18. The non-transitory computer-readable medium of claim 15, wherein the second message includes one of:
  a charging data field that indicates whether to wait for receipt of the charging data response, to the charging data request, before interacting with the third network device, or
  a session rule field that indicates whether to wait for receipt of the charging data response, to the charging data request, before interacting with the third network device.

19. The non-transitory computer-readable medium of claim 15, wherein the one or more instructions, when executed by the one or more processors, further cause the one or more processors to:
  receive, from the second network device, a policy association modification;
  trigger a quality of service update based on the policy association modification;
  receive, from the second network device, a third message indicating whether to wait for receipt of another charging data response, to another charging data request, before interacting with the third network device; and
  provide the other charging data request to the fourth network device while interacting with the third network device when the third message indicates not to wait for receipt of the other charging data response.

20. The non-transitory computer-readable medium of claim 19, wherein the policy association modification is associated with a video call or a voice call for a user equipment.

* * * * *